Patented Feb. 6, 1951

2,540,789

UNITED STATES PATENT OFFICE 2,540,789

PROCESS FOR THE PRODUCTION OF BENZONITRILE

Frank A. Klimitas, Pitman, and Herbert E. Rasmussen, Woodbury, N. J., assignors to Socony-Vacuum Oil Company, Incorporated, a corporation of New York No Drawing. Application October 4, 1949, Serial No. 119,571

2 Claims. (Cl. 260—465)

This invention relates, broadly, to a process for producing benzonitrile and is more particularly concerned with a catalytic process for the production of benzonitrile from toluene and ammonia.

In accordance with the process disclosed and claimed in U. S. Patent No. 2,450,632, benzonitrile is produced by reacting toluene with ammonia, in the vapor phase and at temperatures varying between about 850° F. and about 1250° F., and in the presence of a catalytic material containing molybdenum oxide. In accordance with this process, it is essential to use a catalyst containing molybdenum oxide.

It has now been discovered that in the process disclosed in the aforementioned patent, it is possible to obtain commercially feasible conversions per pass of toluene to benzonitrile, in the absence of catalysts containing molybdenum oxide and at appreciably lower temperatures. It has been found that the use of air in conjunction with activated carbon in the reaction between toluene and ammonia produces benzonitrile. In view of the lower cost of activated carbon catalysts and of the use of lower reaction temperatures, the commercial and operational advantages of such a process over the process utilizing a molybdenum oxide catalyst are manifest.

Accordingly, it is an object of the present invention to provide a process for the production of benzonitrile. An important object is to provide a catalytic process for the production of benzonitrile which is inexpensive and commercially feasible. A specific object is to provide commercially feasible conversions per pass of toluene to benzonitrile and improved ultimate yields of benzonitrile in a catalytic process which comprises reacting toluene with ammonia, in the vapor phase, at elevated temperatures, and in the presence of air and an activated carbon catalyst. Other objects and advantages of the present invention will become apparent to those skilled in the art from the following description.

Broadly stated, the present invention provides a process for the production of benzonitrile, which comprises contacting toluene with ammonia, in the vapor phase, at temperatures varying between about 500° F. and about 900° F., in the presence of an activated carbon catalyst and in the presence of air in amounts upwards of about 15 per cent by weight, based on the weight of the toluene.

The ratio of ammonia to toluene in the charge may vary over a wide range with little effect on the ultimate yield of benzonitrile. In general, the reaction mixture may contain as little as 2 mol per cent or as much as 98 mol per cent of toluene. Ordinarily, however, it is preferred to use charges containing between about 20 mol per cent and about 90 mol per cent of toluene.

In accordance with the present invention, air is added to the reaction zone directly, or it may be charged in admixture with one or both of the reactants. In practice it is preferred to charge the air in admixture with the reactants. Air in amounts as small as 15 per cent, based on the weight of the toluene, produces the results contemplated herein. Ordinarily, however, air in amounts varying between about 30 per cent and about 75 per cent, based on the weight of the toluene, produces the most satisfactory results. It is to be understood, however, that air may be used in amounts greater than about 75 per cent of the weight of the toluene, it being within the skill of one versed in the art to determine the optimum amount of air to be used in any specific operation.

As stated hereinbefore, the catalyst operative to produce benzonitrile by reacting toluene with ammonia, in the process of the present invention, is activated carbon. In general, activated carbon is charcoal produced by the destructive distillation of vegetable matter, such as wood, nut shells, rice hulls, etc.

The reaction or contact time, i. e., the period of time during which a unit volume of the reactants is in contact with a unit volume of catalyst, may vary between a fraction of a second and several minutes. Thus, the contact time may be as low as 0.01 second and as high as 20 minutes. It is preferred to use contact times varying between 0.1 second and one minute, particularly, between 0.3 second and 30 seconds. It must be realized that at best these figures are estimates based on a number of assumptions. For all practical purposes, as in catalytic processes of the type of the present invention, the more reliable data on contact time is best expressed, as is well known in the art, in terms of liquid space velocities, in the present instance, the volume of toluene per volume of catalyst per hour. Accordingly, it has been found that the space velocities may be varied considerably and that velocities varying between about one-fourth and about four are quite satisfactory for the purposes contemplated herein.

In general, the temperatures to be used in the process of the present invention vary between about 500° F. and about 900° F., and, preferably, between about 600° F. and about 800° F. Generally speaking, the higher temperatures increase the conversion per pass, but they also decrease the ultimate yields of benzonitrile by increasing the decomposition of the reactants. Accordingly, the criteria for determining the optimum temperature to be used in any particular operation will be based on the type of activated charcoal catalyst and a consideration of commercial feasibility from the standpoint of striking a practical balance between conversion per pass and losses to decomposition.

The process of the present invention may be carried out at subatmospheric, atmospheric or superatmospheric pressures. Superatmospheric pressures are advantageous in that unreacted charge materials condense more readily. Subatmospheric pressures appear to favor the reactions involved, since the reaction products have a larger volume than the reactants, and hence, it is evident from the Le Chatelier-Braun principle that the equilibrium favors nitrile formation more at reduced pressures. However, such pressures reduce the throughput of the reactants and present increased difficulties in recycling unreacted charge materials. Therefore, atmospheric or superatmospheric pressures are preferred.

The present process may be carried out by making use of any of the well-known techniques for operating catalytic reactions in the vapor phase effectively. By way of illustration, toluene and ammonia may be vaporized separately in preheating zones. The vaporized reactants are then introduced, in suitable proportions, together with suitable proportions of air, into a reaction zone containing an activated carbon catalyst. The reaction zone may be a chamber of any suitable type useful in contact-catalytic operations; for example, a catalyst bed contained in a shell or a shell through which the catalyst flows concurrently, or countercurrently, with the reactants. The vapors of the reactants are maintained in contact with the catalyst at a predetermined elevated temperature and for a predetermined period of time, both as set forth hereinbefore, and the resulting reaction mixture is passed through a condensing zone into a receiving chamber. It will be understood that when the catalyst flows concurrently, or countercurrently, with the reactants in a reaction chamber, the catalyst will be thereafter suitably separated from the reaction mixture by disengaging baffles, etc. The reaction mixture will be, predominantly, a mixture of benzonitrile, hydrogen, unchanged toluene, unchanged ammonia, and air. The benzonitrile and the unchanged toluene will be condensed in passing through the condensing zone and will be retained in the receiving chamber. Benzonitrile can be separated from the unchanged toluene by any of the numerous and well-known separation procedures, such as fractional distillation. Similarly, the uncondensed hydrogen and unchanged ammonia can be separated from each other by absorbing ammonia in a suitable medium and then recovering it. The unchanged toluene and ammonia can be recycled to the process, with or without the addition of fresh toluene or ammonia, or both. It will be apparent that the process may be operated as a batch or discontinuous process, if desired.

The following specific examples are for the purpose of illustrating the mode of preparing benzonitrile in accordance with the process of the present invention, and for the purpose of demonstrating the advantages thereof. It is to be clearly understood that the invention is not to be limited to the specific catalyst disclosed hereinafter, or to the conditions and manipulations set forth in the examples.

*Examples 1 to 9*

The reaction system included a reactor containing 100 parts by weight of catalyst; preheating zone; a condensing zone; a receiving chamber; and gas separators and scrubbers. In each of the runs, toluene and ammonia were preheated separately in the preheating zones. The reactants were continuously charged in the vapor phase into the reactor in an ammonia-toluene mol ratio varying between about one and about 1.3, at such a rate that the liquid space velocity was about 2.0. During this operation, air, when used, was introduced into the toluene stream passing into the preheater. The reaction mixture passed from the reactor, through the condensing zone, into a receiving chamber. The unchanged ammonia, light gases and hydrogen were sent to the gas separators and scrubbers where they were continuously scrubbed with water. The hydrogen and light gases were metered and vented. The ammonia was discarded. The benzonitrile and unchanged toluene were separated by distillation; the benzonitrile was drawn off and the toluene was recycled to the toluene preheater.

The pertinent data and the results of each run are tabulated in the table.

*Table*

| Run No. | Temperature, °F. | Air, Liters per Minute | Conversion per Pass, Grams of Benzonitrile per 100 Grams of Toluene Charged |
| --- | --- | --- | --- |
| 1[1] | 500 | 1.3 | 0.7 |
| 2[1] | 600 | 0.8 | 3.0 |
| 3[1] | 800 | 1.3 | 2.9 |
| 4[1] | 900 | 1.0 | 1.5 |
| 5[2] | 600 | 1.3 | 0.5 |
| 6[2] | 700 | 0.7 | 2.9 |
| 7[2] | 800 | 0.8 | 2.6 |
| 8[2] | 950 | 1.3 | 1.8 |
| 9[2] | 800 | | Nil |

[1] Activated carbon (solvent grade) supplied by Carbide and Carbon Chemical Company.
[2] Activated carbon (cocoanut charcoal) supplied by Fischer Scientific Company.

It will be apparent from the foregoing that the present process provides an efficient, inexpensive, and safe process for obtaining benzonitrile. The process is of considerable value in making commercially available relatively inexpensive benzonitrile which is useful, for example, as an intermediate in organic synthesis, resin manufacture, etc.

Although the present invention has been described with preferred embodiments, it is to be understood that modifications and variations may be resorted to without departing from the spirit and scope of this invention, as those skilled in the art will readily understand. Such variations and modifications are considered to be within the purview and scope of the appended claims.

What is claimed is:

1. The process for producing benzonitrile, which comprises contacting toluene with ammonia, in the gaseous phase, at a temperature varying between about 600° F. and about 800° F., and in the presence of air in amounts of at least about 15 per cent, based on the weight of said toluene, and of a catalyst consisting essentially of activated carbon.

2. The process for producing benzonitrile, which comprises contacting toluene with ammonia, in the gaseous phase, at a temperature varying between about 600° F. and about 800° F., and in the presence of air in amounts varying between about 30 per cent and about 75 per cent, based on the weight of said toluene, and of a catalyst consisting essentially of activated carbon.

FRANK A. KLIMITAS.
HERBERT E. RASMUSSEN.

REFERENCES CITED

The following references are of record in the file of this patent:

UNITED STATES PATENTS

| Number | Name | Date |
|---|---|---|
| 2,499,055 | Cosby et al. | Feb. 28, 1950 |

OTHER REFERENCES

Berkman et al.: "Catalysis" (Reinhold), pp. 788–789, 804 (1940).